US010990268B2

(12) United States Patent
Luo et al.

(10) Patent No.: US 10,990,268 B2
(45) Date of Patent: Apr. 27, 2021

(54) OPERATION METHOD AND TERMINAL DEVICE

(71) Applicant: BEIJING BYTEDANCE NETWORK TECHNOLOGY CO LTD., Beijing (CN)

(72) Inventors: Yonghao Luo, Beijing (CN); Xiaomu Zhu, Beijing (CN); Dawei Geng, Beijing (CN)

(73) Assignee: BEIJING BYTEDANCE NETWORK TECHNOLOGY CO LTD., Beijing (CN)

( * ) Notice: Subject to any disclaimer, the term of this patent is extended or adjusted under 35 U.S.C. 154(b) by 0 days.

(21) Appl. No.: 16/667,809

(22) Filed: Oct. 29, 2019

(65) Prior Publication Data

US 2020/0064979 A1 Feb. 27, 2020

Related U.S. Application Data

(63) Continuation of application No. 15/388,448, filed on Dec. 22, 2016, now Pat. No. 10,496,267.

(30) Foreign Application Priority Data

Sep. 22, 2016 (CN) .......................... 201610842914.1

(51) Int. Cl.
*G06F 3/14* (2006.01)
*G06F 3/0486* (2013.01)
(Continued)

(52) U.S. Cl.
CPC .......... *G06F 3/0486* (2013.01); *G06F 3/0488* (2013.01); *G06F 3/04817* (2013.01); *G06F 3/04883* (2013.01); *G06F 2203/04803* (2013.01)

(58) Field of Classification Search
CPC ................................. G06F 3/14; G06F 3/0486
(Continued)

(56) References Cited

U.S. PATENT DOCUMENTS 10,126,914 B2 11/2018 Hiroura
2014/0089833 A1* 3/2014 Hwang ................. G06F 3/0488
715/769

(Continued)

FOREIGN PATENT DOCUMENTS

| CN | 102915176 A | 2/2013 |
| CN | 104092815 A | 10/2014 |
| CN | 105528141 A | 4/2016 |

*Primary Examiner* — Ruay Ho
(74) *Attorney, Agent, or Firm* — Mauriel Kapouytian Woods LLP; Lana Akopyan; Michael Mauriel

(57) ABSTRACT

An operation method and a terminal device are provided for simplifying operations between applications. The method according to an embodiment includes: receiving a screen splitting instruction, splitting a screen into an original application display region and a new display region, where the new display region is configured to display history operation content and at least one application icon, receiving a target operation instruction, determining target content and a target application icon corresponding to the instruction, and transmitting the target content to an application program corresponding to the target application icon in response to the target operation instruction, where the target content is content selected in the history operation content or content selected in the original application display region.

20 Claims, 15 Drawing Sheets

(51) Int. Cl.
*G06F 3/0488* (2013.01)
*G06F 3/0481* (2013.01)

(58) Field of Classification Search
USPC .................................................. 715/769, 781
See application file for complete search history.

(56) References Cited

U.S. PATENT DOCUMENTS

| | | | |
|---|---|---|---|
| 2014/0164966 A1* | 6/2014 | Kim | G06F 16/168 |
| | | | 715/769 |
| 2014/0317555 A1* | 10/2014 | Choi | G06F 3/04883 |
| | | | 715/781 |
| 2017/0017451 A1 | 1/2017 | Sathyanarayana Raghu et al. | |
| 2018/0032997 A1* | 2/2018 | Gordon | G06Q 30/0269 |
| 2018/0081517 A1 | 3/2018 | Luo et al. | |

* cited by examiner

OPERATION METHOD AND TERMINAL DEVICE

CROSS REFERENCE TO RELATED APPLICATION

The present application is a continuation of U.S. patent application Ser. No. 15/388,448, filed on Dec. 22, 2016, which claims the priority to Chinese Patent Application No. 201610842914.1, titled "OPERATION METHOD AND TERMINAL DEVICE", filed on Sep. 22, 2016 with the National Intellectual Property Administration of People's Republic of China, both of which are incorporated herein by reference in their entirety.

TECHNICAL FIELD

The present disclosure relates to the field of Internet, and in particular to an operation method and a terminal device.

BACKGROUND

In using a smart phone, editing of an article, a picture or a text includes a large amount of operation on targets. In the conventional art, the editing of a picture or a text is usually performed in a corresponding application (shortened as app), such as editing a text in a note app, editing a text in a mail app, editing a picture in various picture apps, sending a picture or a text in the WeChat, and editing a text or a picture in a short message.

At present, when operating a picture or a text in an app, a user can operate in only one app at the same time, which is cumbersome. For example, if a user wants to copy a text from an application A and pastes the text to an application B, the user has to first open the application A, select and copy the text, then open the application B, and paste the copied text to the application B. Thus the operations between applications are cumbersome.

SUMMARY

An operation method and a terminal device are provided according to an embodiment of the present disclosure, which can simplify operations between applications.

In a first aspect, an operation method is provided according to an embodiment of the present disclosure, which is applied to a terminal device with a touch-sensitive display. The method includes:
receiving a screen splitting instruction; splitting a screen of the touch-sensitive display into an original application display region and a new display region in response to the screen splitting instruction, where the new display region is configured to display history operation content and at least one application icon; receiving a target operation instruction; determining target content and a target application icon corresponding to the target operation instruction, where the target content is content selected in the history operation content or content selected in the original application display region, and the target application icon is an application icon in the new display region; and transmitting the target content to an application program corresponding to the target application icon in response to the target operation instruction.

Based on the first aspect, in a first possible implementation of the first aspect, the new display region includes a first display region and a second display region. The first display region is configured to display the history operation content, and the second display region is configured to display the at least one application icon.

Based on the first possible implementation of the first aspect, in a second possible implementation of the first aspect, the first display region includes a document region, which contains a document recently operated by a user.

Based on any one of possible implementations of the first aspect, in a third possible implementation of the first aspect, the first display region includes a picture region, which contains a picture recently operated by the user.

Based on any one of possible implementations of the first aspect, in a fourth possible implementation of the first aspect, the first display region includes a text region, which contains a text recently operated by the user.

Based on any one of possible implementations of the first aspect, in a fifth possible implementation of the first aspect, the first display region includes a favorites region, which contains a link collected by a system.

Based on any one of possible implementations of the first aspect, in a sixth possible implementation of the first aspect, the application icon includes an application icon, an application execution window icon, or a port of an application sharing program.

Based on any one of possible implementations of the first aspect, in a seventh possible implementation of the first aspect, the target operation instruction is a drag operation instruction, and the transmitting the target content to an application program corresponding to the target application icon in response to the target operation instruction includes: copying the target content to the application program corresponding to the target application icon in response to the drag operation instruction.

Based on the seventh possible implementation of the first aspect, in an eighth possible implementation of the first aspect, in a case that the target application icon is an application icon or an icon of a port of an application sharing program and after the target content is copied to the application program corresponding to the target application icon in response to the drag operation instruction, the method further includes: displaying the application program corresponding to the target application icon in the original application display region, where the target content is in an editable state in the application program corresponding to the target application icon.

Based on the seventh possible implementation of the first aspect, in a ninth possible implementation of the first aspect, in a case that the target application icon is an application execution window icon and after the target content is copied to the application program corresponding to the target application icon in response to the drag operation instruction, the method further includes: displaying a drag number indicator on the application execution window icon, where the drag number indicator is configured to indicate the number of dragging performed for an application execution window corresponding to the application execution window icon.

In a second aspect, an operation method is provided according to an embodiment of the present disclosure, which is applied to a terminal device with a touch-sensitive display. The method includes:
receiving a screen splitting instruction; and splitting a screen of the touch-sensitive display into an original application display region and a new display region in response to the screen splitting instruction, where the new display region includes a first display region and a second display region, the first display region is configured to display history operation content, and the second display region is configured to display at least one application icon.

In a third aspect, a terminal device is provided according to an embodiment of the present disclosure, which realizes a function corresponding to an operation method provided in the above first or second aspect. The function may be implemented by hardware, and also may be implemented by hardware executing a corresponding software program. The hardware and software include one or more unit modules corresponding to the above functions. The unit module may be software and/or hardware.

In a possible design, the terminal device includes:

a screen splitting instruction receiving unit, configured to receive a screen splitting instruction;

a screen splitting unit, configured to split a screen of a touch-sensitive display into an original application display region and a new display region in response to the screen splitting instruction, where the new display region is configured to display history operation content and at least one application icon;

an operation instruction receiving unit, configured to receive a target operation instruction and determine target content and a target application icon corresponding to the target operation instruction, where the target content is content selected in the history operation content or content selected in the original application display region, and the target application icon is an application icon in the new display region; and an operation unit, configured to transmit the target content to an application program corresponding to the target application icon in response to the target operation instruction.

In a possible design, the terminal device includes:

a screen splitting receiving unit, configured to receive a screen splitting instruction; and a screen splitting unit, configured to split a screen of a touch-sensitive display into an original application display region and a new display region in response to the screen splitting instruction, where the new display region includes a first display region and a second display region, the first display region is configured to display history operation content, and the second display region is configured to display at least one application icon.

According to the above technical solutions, the embodiment of the present disclosure has the following advantages.

In the embodiments of the present disclosure, a screen splitting instruction triggered by the user is received. A screen is split into an original application display region and a new display region. The new display region is configured to display history operation content and an application icon set. Then after a target operation instruction is received, the target content is transmitted to an application program corresponding to the target application icon in response to the target operation instruction. With the operation method according to the embodiment of the present disclosure, the screen display region can be split, which is advantageous for the user, through the related operation, to directly transmit the content in a currently operated region (i.e., the original application display region) or the previously operated content to a target application (an application corresponding to an application icon) which needs to be operated in future. Thus, the operation of the target content by the user between applications can be simplified.

DETAILED DESCRIPTION OF THE EMBODIMENTS

In order to make the technical solution and the advantageous effect of the present disclosure more clear, the present disclosure will be described in further detail as follows in conjunction with the accompany drawings and the embodiments. It is understood that the described embodiments herein are only to explain the present disclosure, which are not intended to limit the present disclosure.

An embodiment of the present disclosure may be applied to a terminal device installed with an intelligent operating system. The terminal device may be a user device in various forms such as a smart phone, a tablet computer, a vehicle device and a wearable device. And the intelligent operating system may be Android, iOS, Windows Phone and other operating systems.

The embodiments of the present disclosure are described with an example of Android operating system.

Figure 1:
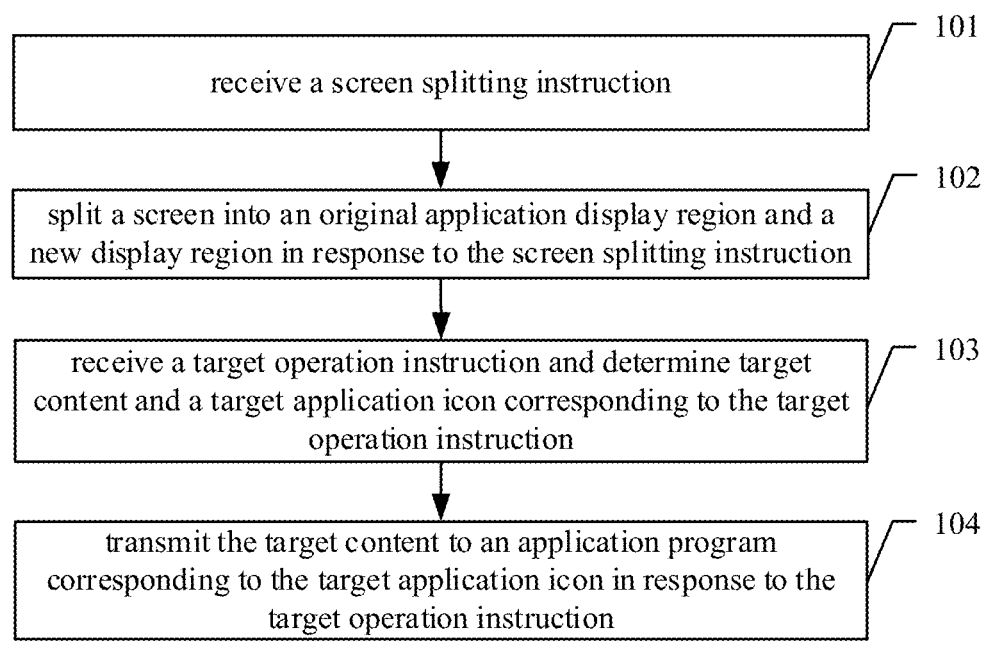
FIG. 1 is a flow chart of an operation method according to an embodiment of the present disclosure.

An operation method according to an embodiment of the present disclosure is shown in FIG. 1, which is described in detail hereinafter.

In step 101, a screen splitting instruction is received.

The generation of the screen splitting instruction may be triggered through an intelligent terminal screen by a user with a specific gesture. The specific gesture may be a sliding gesture shown in FIG. 2.

Optionally, the generation of the screen splitting instruction may also be triggered by other means. For example, the generation of the screen splitting instruction is triggered automatically by a certain system event or an event in an application. Alternatively, the generation of the screen splitting instruction is triggered by clicking a splitting button which is provided for the user in a system interface or an application interface. Alternatively, the generation of the screen splitting instruction is triggered through a physical button on an intelligent terminal. The specific means for generating the screen splitting instruction are not limited to the embodiments of the present disclosure.

In step 102, a screen is split into an original application display region and a new display region in response to the screen splitting instruction.

Figure 2:
FIG. 2 is a schematic diagram of a gesture for triggering screen splitting according to an embodiment of the present disclosure.
Figure 3:
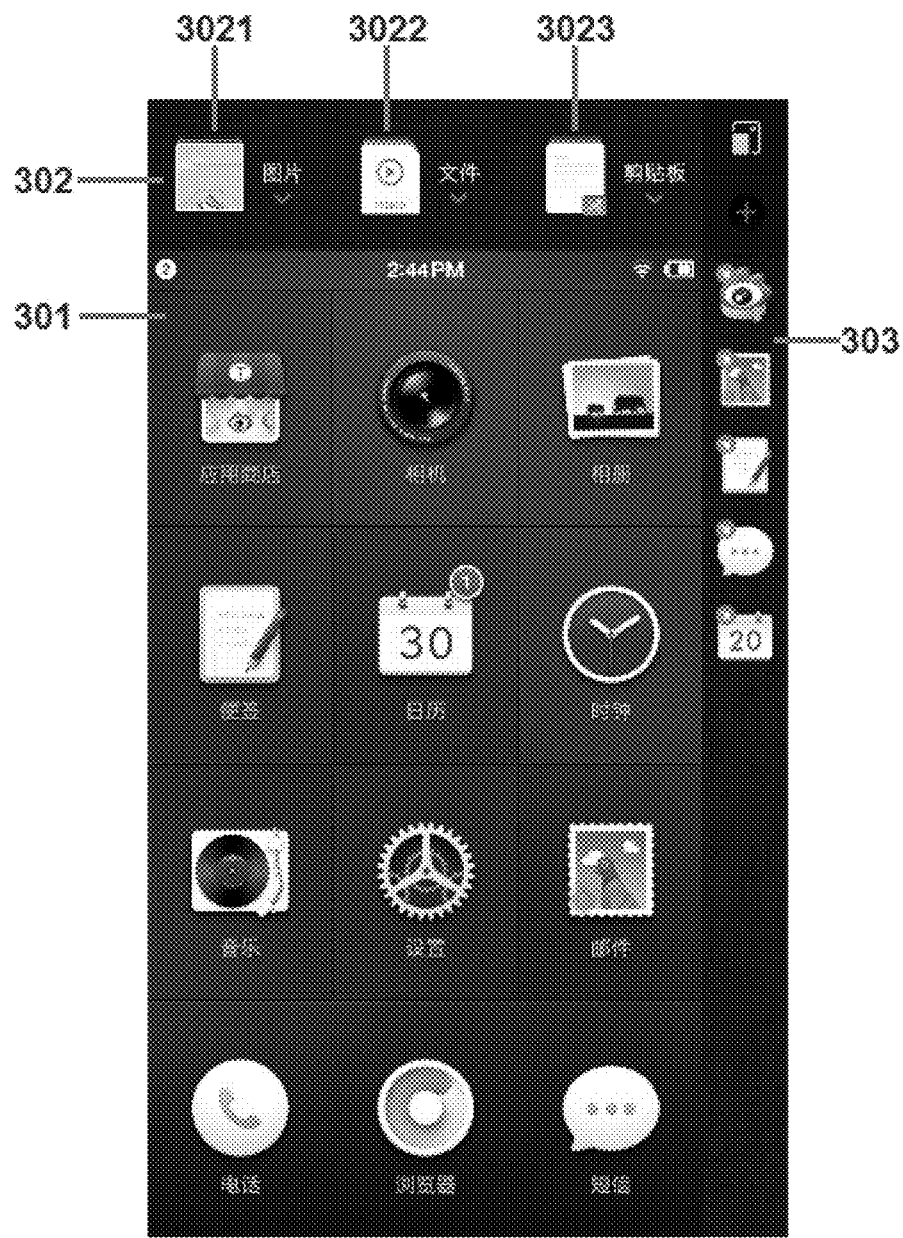
FIG. 3 is a schematic diagram of a display of each region after screen splitting according to an embodiment of the present disclosure.

After the screen splitting instruction is received, a display screen is split into the original application display region and the new display region. As shown in FIG. 3, reference number 301 indicates the original application display region, i.e., a display screen before splitting as shown in FIG. 2. The display region is a region in which the user currently operates. The new display region is configured to display history operation content and at least one application icon.

Optionally, in order to distinguish history operation content and application icons, the new display region may be split into a first display region 302 and a second display region 303. The first display region 302 is configured to display the history operation content, and the second display region 303 is configured to display at least one application icon (a application icon set).

It should be noted that, the specific interface content shown in UI illustrations (FIGS. 2 to 14) according to the embodiments of the present disclosure is only described as examples, which is not intended to limit embodiments of the present disclosure.

In an embodiment of the present disclosure, the original application display region and the new display region may also be displayed in other forms to be distinguished. The first display region and the second display region in the new display region may also be in other display forms than the display form shown in FIG. 3. For example, the first display region is displayed in the lower region of the screen, the right region of the screen, or the left region of the screen. Accordingly, icons in the second display region may be displayed in the lower region of the screen, the upper region of the screen, or the left region of the screen, which is not limited in the embodiments of the present disclosure.

Figure 4:
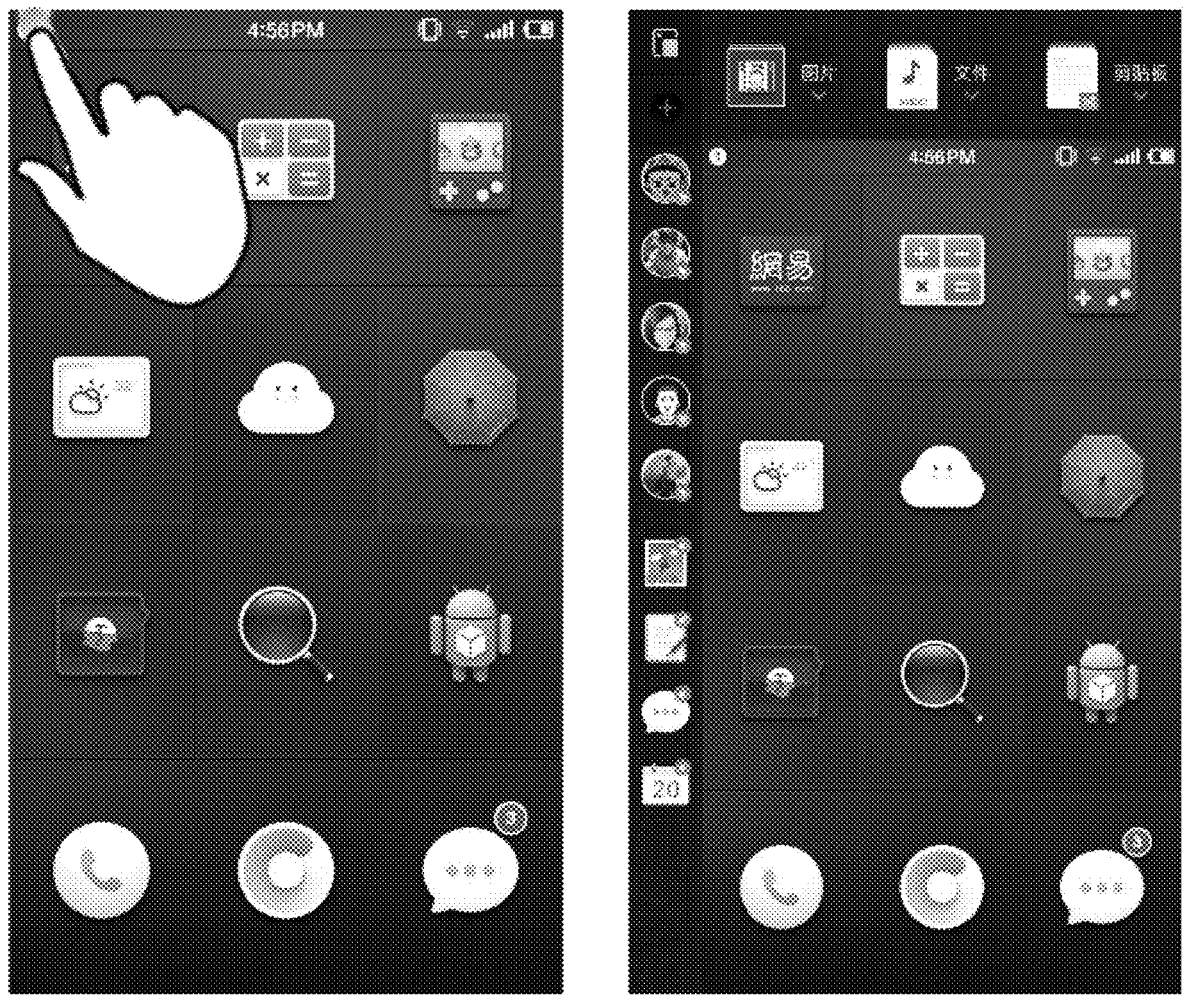
FIG. 4 is a schematic diagram of another gesture for triggering screen splitting and display of each region after screen splitting according to an embodiment of the present disclosure.

As shown in FIG. 4, the specific gesture in step 101 may also be a sliding gesture as shown in the left side of FIG. 4. In response to a screen splitting instruction triggered by the gesture, a screen is split as the splitting display shown in the right side of FIG. 4. In an embodiment of the present disclosure, a gesture for triggering the screen splitting instruction is not limited to the gestures in FIG. 2 and FIG. 4, that is, the trigger position and the sliding direction of the gesture are not limited. Accordingly, in the embodiments of the present disclosure, the screen splitting display positions of the first display region and the second display region in the new display region are not limited to the screen splitting display positions in FIG. 3 and FIG. 4, that is, the specific mode for screen splitting is not limited.

Optionally, the first display region may also include a picture region 3021. The picture region contains a picture which is operated recently by the user.

Optionally, the first display region may include a document region 3022. The document region contains a document which is operated recently by the user.

Optionally, the first display region also includes a text region 3023. The text region contains a text which is operated recently by the user. The recently operated text is cached in a clipboard.

Optionally, the first display region may also include a favorites region. The favorites region contains a link collected by a system.

Optionally, an application icon in the second display region 303 may include an application icon, an application execution window icon, or a port of an application sharing program. The application icon represents the application itself, such as a WeChat application icon, a notebook icon. The application execution window icon represents a session window of the application execution program, such as a chat window with a contact in the WeChat, a newly established notebook window in the notebook app. The port of the application sharing program is a one-touch sharing port of an application that can be invoked by another application, such as a sharing port for the friend circle of the WeChat, a sharing port of microblog.

Figure 5:
FIG. 5 is a schematic diagram of a picture region interaction in a first display region according to an embodiment of the present disclosure.

In addition, each sub-region (the sub-region refers to the above document region, picture region, text region, favorites region, etc.) of the first display region may be clicked to generate a floating layer, in which corresponding history operation content in the sub-region is displayed in the floating layer. As shown in FIG. 5, a picture region is clicked, and a floating layer appears to display history pictures. With clicking each of other sub-regions, a corresponding floating layer may appear to display corresponding content, which is not illustrated one by one in the present disclosure.

It should be noted that, if the screen width of the first display region is insufficient to display multiple sub-regions, a left/right sliding gesture may be supported in the first display region to present each sub-region icon. Similarly, if the height of the second display region is insufficient to display multiple application icons, an up/down sliding gesture may be supported in the second display region to present each application icon.

In step 103, a target operation instruction is received, and target content and a target application icon corresponding to the target operation instruction are determined.

The target content is content selected in the first display region or content selected in the original application display region, and the target application icon is at least one application icon in the second display region.

In step 104, the target content is transmitted to an application program corresponding to the target application icon in response to the target operation instruction.

After the target operation instruction is received, in response to the target operation instruction, the content selected in the first display region or selected in the original application display region is transmitted to the application program corresponding to the target application icon.

Optionally, the target operation instruction may be a drag operation. The step of transmitting the target content to an application program corresponding to the target application icon in response to the target operation instruction may be performed as follows. In response to the drag operation instruction, a drag object (i.e., the target content) is dragged to an application icon in the second display region, so that the target content can be transmitted to the application program corresponding to the target application icon. The drag object is content selected in the first display region during the drag process, or content selected in the original application display region during the drag process. A touch event for selecting content may be a long pressing event.

Figure 6:
FIG. 6 is a schematic diagram of a drag interaction in a case that target content is a text according to an embodiment of the present disclosure.
Figure 7:
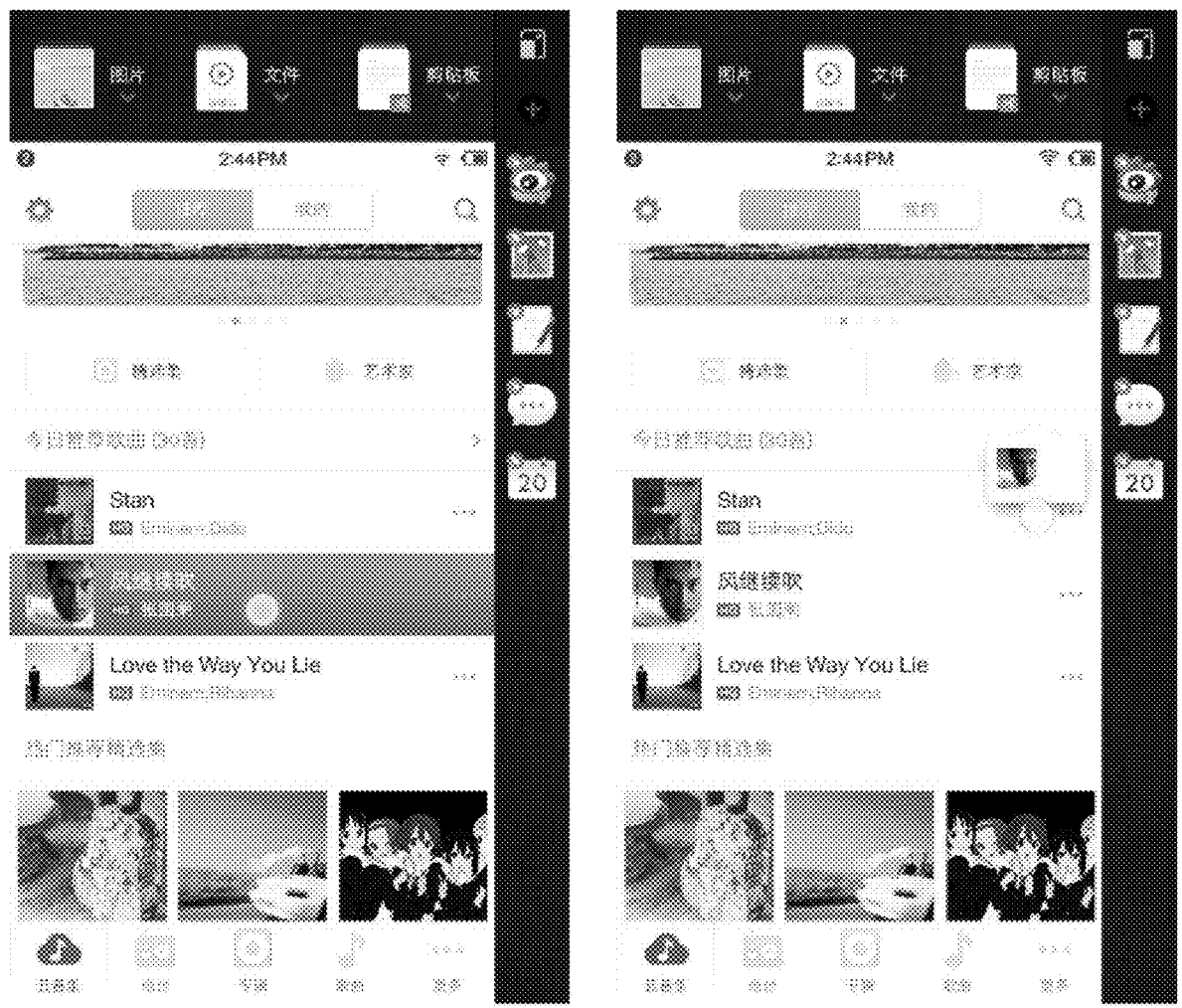
FIG. 7 is a schematic diagram of a drag interaction in a case that target content is a song according to an embodiment of the present disclosure.
Figure 8:
FIG. 8 is a schematic diagram of a drag interaction in a case that target content is a webpage link address according to an embodiment of the present disclosure.

Specifically, a drag object in the original application display region may be a selected text, song, webpage link address, or picture, which may be different depending on the content supported to be selected in each application. As shown in FIG. 6, the drag object is a text in a contact session of a communication application, in which the left side of FIG. 6 shows the selected text, and the right side of FIG. 6 shows drag indicator information presented during the drag process. As shown in FIG. 7, the drag object is a song in a music application, in which the left side of FIG. 7 shows the selected song, and the right side of FIG. 7 shows drag indicator information presented during the drag process. As shown in FIG. 8, the drag object is a webpage link address in a browser application, in which the left side of FIG. 8 shows the selected webpage link, and the right side of FIG. 8 shows drag indicator information presented during the drag process. Similarly, reference may be made to FIG. 6, 7 or 8 for an interactive process of other drag object in the original application display region.

Figure 9:
FIG. 9 is a schematic diagram of a drag interaction in a case that target content is a picture in a first display region according to an embodiment of the present disclosure.

Specifically, a drag object in the first display region is history operation content in each sub-region. For example, a schematic diagram of an interaction for dragging a history picture is shown in FIG. 9.

Optionally, during the drag process, if the target application icon to which a drag object is dragged is an application icon or a port icon of an application sharing program, then after the target content is dragged to an application program corresponding to the target application icon in response to the drag operation instruction, the application program interface corresponding to the target application icon is displayed in the original application display region, and a user can edit the target content in the application program.

It should be noted that, during the drag process, application execution windows triggered by different application icons are different. For example, an application execution window triggered by a mail application icon is a new mail window, and an application execution window triggered by a port icon of a microblog sharing program is a window for sharing microblog.

Figure 10:
FIG. 10 is a schematic diagram of an interaction of a drag operation according to an embodiment of the present disclosure.

As shown in FIG. 10, a drag object in FIG. 6 is dragged to a target application icon, which is a mail application icon 901, in the second display region. Upon completion of the dragging, the new mail program of the mail application is triggered, a new mail A is created, an execution window icon 902 for the mail is displayed in the second display region, and the new mail is displayed in the original application display region. The target content dragged in FIG. 6 is pasted in the new mail as the mail body, and the pasted target content can be edited.

Further, during the drag operation, if the target application icon to which a drag object is dragged is an application execution window icon, then after the target content is dragged to the application execution window icon in response to the drag operation instruction, the application execution session window is not displayed in the original application display region, while a drag number indicator is displayed on the application execution window icon. The drag number indicator is configured to indicate the number of dragging the application execution window. When an instruction that the user clicks the application execution window icon is received, the application execution session window is displayed in the original application display region. In the application execution session window, a processing such as pasting, moving, deleting and editing may be performed on the dragged target content.

Figure 11:
FIG. 11 is a schematic diagram of another interaction of a drag operation according to an embodiment of the present disclosure.

As shown in FIG. 11, other target content (such as the selected text in FIG. 11) is dragged from another application (such as a conversation with a contact in FIG. 11) to the new mail A in FIG. 10. After the dragging is completed, a drag number indicator is displayed in a floating bubble form on the mail execution window icon in the second display region. For example, the number "1" in a corner index indicated by 1001 in FIG. 11 indicates that one drag is performed for the new mail A, and the target content from this drag may be edited and processed in the new mail A.

Figure 12:
FIG. 12 is a schematic diagram of another interaction of a drag operation according to an embodiment of the present disclosure.

As shown in FIG. 12, other target content (such as the selected text in FIG. 12) is dragged from another application (such as a conversation with a contact in FIG. 12) to the new mail A in the FIG. 10. After the dragging is completed, a drag number indicator is displayed in a floating bubble form on the mail execution window icon in the second display region. For example, the number "2" in the corner index indicated by 1101 in FIG. 12 indicates that two drags is performed for the new mail A, and the target content from the two drags may be edited and processed in the new mail A.

Figure 13:
FIG. 13 is a schematic diagram of presenting target content after dragging according to an embodiment of the present disclosure.

As shown in FIG. 13, when it is received that the user clicks the mail execution window icon where the corner index indicated by 1101 in FIG. 12 is located, the new mail A is displayed in the original application display region. The first dragged target content 1201 and the second dragged target content 1202 are presented in the new mail A, which may be in a floating bubble form as shown in FIG. 13.

Figure 14:
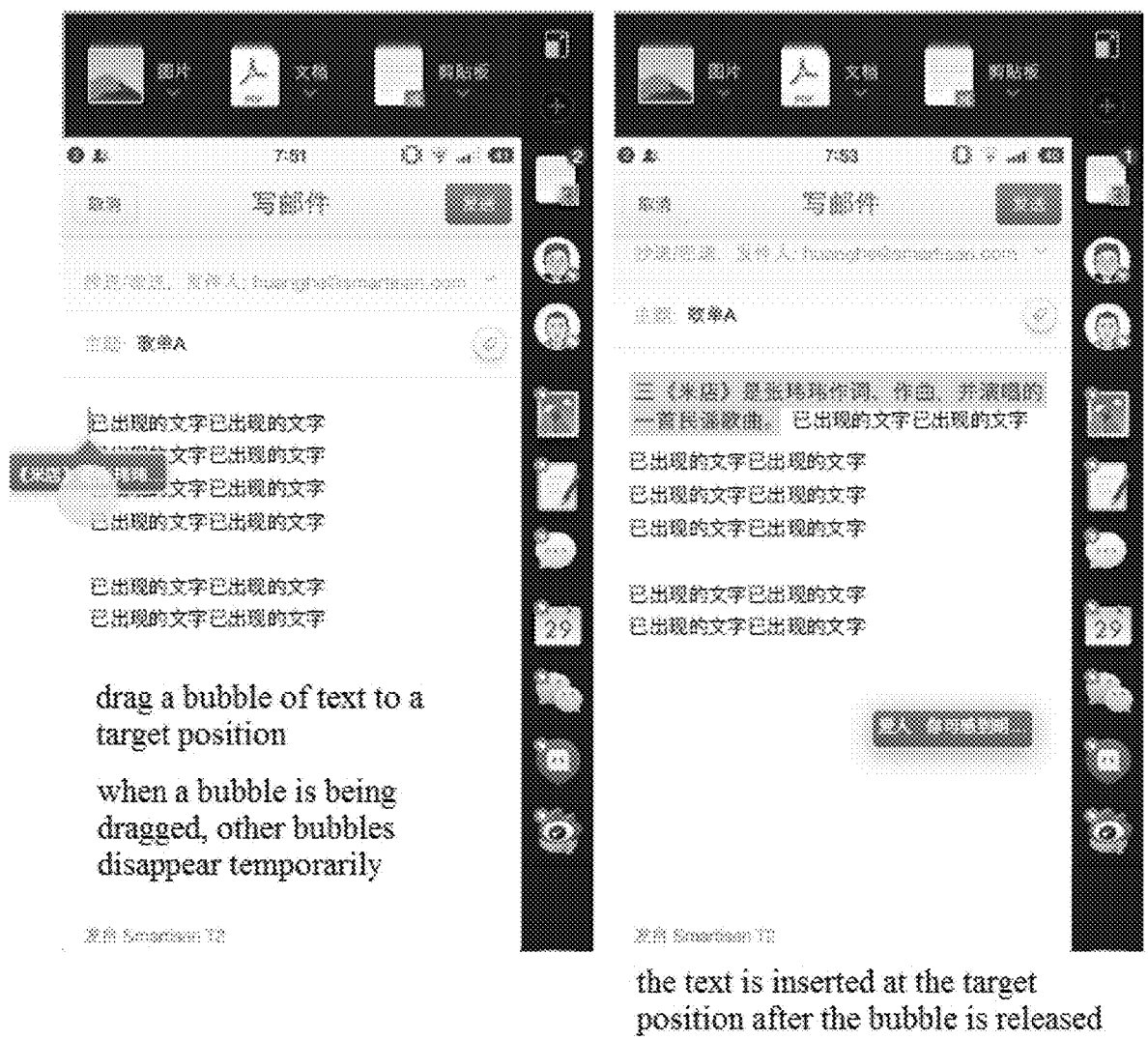
FIG. 14 is a schematic diagram of editing target content after dragging according to an embodiment of the present disclosure.

By dragging the target content 1201 or the target content 1202 in the mail body, the target content can be inserted at a target position. As shown in FIG. 14, the target content 1201 is dragged to a target position. During the drag process, bubbles of other target content may be temporarily disappeared to avoid interference of operation. After the target content 1201 is dragged to a target position, the target content 1201 is inserted at the target position. At the same time, the bubble of the target content 1202 is presented, and the number in the corner index on the mail execution window icon in the second display region changes accordingly.

FIGS. 10 to 14 illustrate, with an example of mail application, an operation of dragging the target content of the original application display region to the target application icon in the second display region according to an embodiment of the present disclosure. It is noted that, reference may be made to the embodiments shown in FIGS. 10 to 14 for description of an operation of dragging the target content in the first display region to the target application icon in the second display region, which is not described in detail in this embodiment. In addition, reference may be made to the embodiments shown in FIGS. 10 to 14 for description of an interactive operation of dragging the target content to an application program corresponding to other target application icon in the second display region, which is not described in detail in this embodiment.

It is noted that, the target operation instruction described in step 104 "the target content is transmitted to an application program corresponding to the target application icon in response to the target operation instruction" may also be other operations than the drag operation, which is not limited in the present disclosure.

According to the embodiment of the present disclosure, a screen splitting instruction triggered by the user is received.

A screen is split into an original application display region and a new display region. Then, a target operation instruction of the user is received. Target content and a target application icon corresponding to the target operation instruction are determined. The target content is transmitted to an application program corresponding to the target application icon in response to the target operation instruction. The target content is history operation content selected in the new display region, or content selected in the original application display region. The target application icon is at least one application icon in the new display region. According to the embodiment of the present disclosure, the screen display region is split, which is advantageous for the user, through the related operation, to directly transmit the content in a currently operated region (i.e., the original application display region) or the previously operated content (i.e., the content in the first display region) to a target application (an application corresponding to an application icon in the second display region) which needs to be operated in future. Thus, the operation of the target content by the user between the applications can be simplified.

The above is a description of the operation method according to an embodiment of the present disclosure, and below a terminal device according to an embodiment of the present disclosure is described from a viewpoint of function modules. The terminal device according to an embodiment of the present disclosure may be various types of user devices such as a smart phone, a tablet phone, a vehicle terminal and a wearable device.

The specific implementation of the terminal device according to an embodiment of the present disclosure corresponds to all or a part of steps of the above operation method according to the embodiment shown in FIG. 1. The function may be implemented by hardware, and also may be implemented by hardware executing a corresponding software program. The hardware and software include one or more unit modules corresponding to the above functions. The unit modules may be software and/or hardware.

In a possible design, the terminal device includes hardware modules such as a processor, a memory, a touch panel, other input device, a display panel, a sensor, an audio circuit, and a Wifi module which are connected to each other. The memory is configured to store an application program, and further configured to store data invoked or generated by an application program during execution. The processor is configured to execute the application program, to execute all or a part of steps of the above embodiment shown in FIG. 1.

Figure 15:
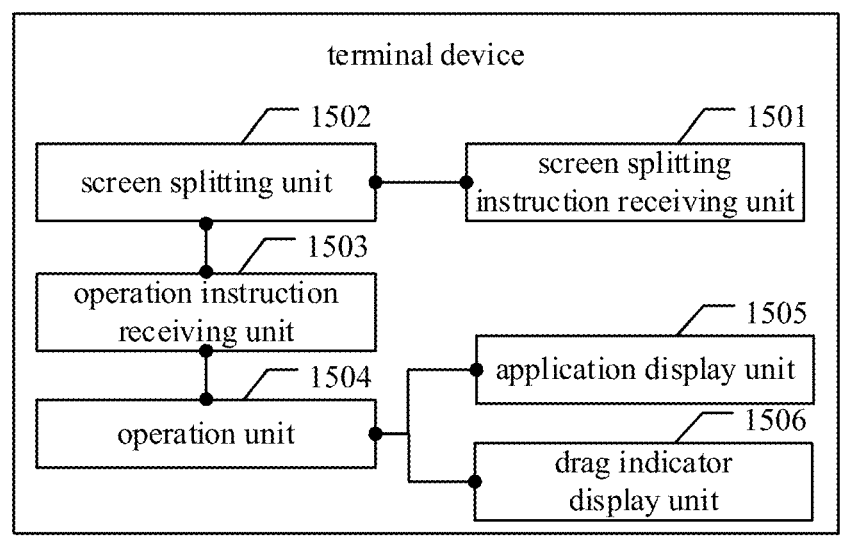
FIG. 15 is a schematic structural diagram of function modules of a terminal device according to an embodiment of the present disclosure.

In a possible design, referring to FIG. 15, a terminal device according to an embodiment of the present disclosure includes a screen splitting instruction receiving unit 1501, a screen splitting unit 1502, an operation instruction receiving unit 1503 and an operation unit 1504.

The screen splitting instruction receiving unit 1501 is configured to receive a screen splitting instruction.

The screen splitting unit 1502 is configured to split a screen of a display into an original application display region and a new display region in response to the screen splitting instruction. The new display region is configured to display history operation content and at least one application icon.

The operation instruction receiving unit 1503 is configured to receive a target operation instruction and determine target content and a target application icon corresponding to the target operation instruction. The target content is content selected in the history operation content or content selected in the original application display region, and the target application icon is an application icon in the new display region.

The operation unit 1504 is configured to transmit the target content to an application program corresponding to the target application icon in response to the target operation instruction.

Optionally, the screen splitting unit 1502 is specifically configured to split the screen into the original application display region and the new display region in response to the screen splitting instruction. The new display region includes a first display region and a second display region. The first display region is configured to display the history operation content, and the second display region is configured to display the at least one application icon.

Optionally, the first display region includes a document region. The document region contains a document which is recently operated by the user. The second display region is configured to display at least one application icon.

Optionally, the first display region includes a picture region. The picture region contains a picture which is recently operated by the user. The second display region is configured to display at least one application icon.

Optionally, the first display region includes a text region. The text region contains a text which is recently operated by the user. The second display region is configured to display at least one application icon.

Optionally, the first display region includes a favorites region. The favorites region contains a link which is collected by a system. The second display region is configured to display at least one application icon.

Optionally, the second display region is configured to display at least one application icon, which includes an application icon, an application execution window icon, or a port of an application sharing program.

Optionally, the target operation instruction is a drag operation instruction. The operation unit 1504 is specifically configured to copy the target content to the application program corresponding to the target application icon in response to the drag operation instruction.

Optionally, in a case that the target operation instruction is a drag operation instruction, the terminal device also includes an application display unit 1505. The application display unit 1505 is configured to display the application program corresponding to the target application icon in the original application display region, in a case that the target application icon is an application icon or an icon of a port of an application sharing program and after the operation unit 1504 drags the target content to the application program corresponding to the target application icon in response to the drag operation instruction. The target content is in an editable state in the application program corresponding to the target application icon.

Optionally, in a case that the target operation instruction is a drag operation instruction, the terminal device also includes a drag indicator display unit 1506. The drag indicator display unit 1506 is configured to display a drag number indicator on an application execution window icon in a case that the target application icon is the application execution window icon and after the operation unit 1504 drags the target content to the application program corresponding to the target application icon in response to the drag operation instruction. The drag number indicator is configured to indicate the number of dragging performed for an application execution window corresponding to the application execution window icon.

Specifically, reference may be made to the method embodiment shown in FIG. 1 for the information interactions and the implementations between the above the screen splitting instruction receiving unit 1501, the screen splitting unit 1502, the operation instruction receiving unit 1503, the operation unit 1504, the application display unit 1505 and the drag indicator display unit 1506, which are not repeated herein.

In addition, in a possible design, a terminal device according to an embodiment of the present disclosure includes a screen splitting instruction receiving unit and a screen splitting unit.

The screen splitting instruction receiving unit is configured to receive a screen splitting instruction.

The screen splitting unit is configured to split a screen of a touch-sensitive display into an original application display region and a new display region in response to the screen splitting instruction. The new display region includes a first display region and a second display region. The first display region is configured to display history operation content, and the second display region is configured to display at least one application icon.

Specifically, reference may be made to steps 101 to 102 in the method embodiment shown in FIG. 1 for the information interactions and the implementations between the above the screen splitting instruction receiving unit and the screen splitting unit, which are not repeated herein.

It is understood clearly by those skilled in the art that, for a convenient and clear description, for specific operation processes of the above systems, devices and units, reference may be made to the corresponding process in the above method embodiment, which is not repeated herein.

In the embodiments mentioned in the disclosure, it is to be understood that, the disclosed system, device and method may be implemented in other ways. For example, the above device embodiment is only illustrative. For example, the division of the units is only a logical functional division. In practice, there may be other divisions. For example, multiple units or assembles may be combined or may be integrated into another system. Alternatively, some features may be neglected or not be performed. The illustrated or discussed mutual coupling or direct coupling or communication connection may be an indirect coupling or communication connection via some interfaces, devices or units, which may be in an electrical, mechanical or other form.

The units described as separate components may be or may not be separate physically, and the components which are illustrated as units may be or may not be physical units, that is, may be located at a same position, or may be distributed over multiple network units. Some or all of the units may be selected as required to implement the solution of the embodiment.

Further, the functional units in the embodiments of the disclosure may be integrated into one processing unit, or may exist physically separately. Alternatively, two or more of the functional units may be integrated into one unit. The above integrated unit may be implemented in hardware, or may also be implemented as a software functional unit.

When being implemented as a software functional unit and being sold and used as a separate product, the integrated unit may be stored in a computer readable storage medium. Based on this, an essential part or a part contributing to the prior art of the technical solution of the disclosure or the whole or a part of the technical solution may be embodied in a software product which is stored in a storage medium, including several instructions for causing a computer device (which may be a personal computer, a server, a network device or the like) to perform all or some of the steps of the method in the embodiment of the disclosure. The above storage medium includes various mediums capable of storing program code, such as a U disk, a movable disk, a Read-Only Memory (ROM), a Random Access Memory (RAM), a magnetic disk or an optical disk.

As described above, the above embodiments are only intended to describe the technical solutions of the disclosure, but not to limit the scope of the disclosure. Although the disclosure is described in detail with reference to the above embodiments, it should be understood by those ordinal skilled in the art that modifications can be made to the technical solutions recorded in the above embodiments or equivalent replacements can be made to some or all of the technical features thereof, which modifications and equivalent replacements will not make the corresponding technical solutions deviate from the scope of the technical solutions of the embodiments of the disclosure.

The invention claimed is:

1. An operation method executed by a processor in a terminal device with a touch-sensitive display, the method comprising:
   receiving a screen splitting instruction, while an original application display region is displayed and prior to displaying a first new display region and a second new display region;
   in response to the screen splitting instruction, splitting a screen of the touch-sensitive display into a reduced size display region displaying the original application display region, the first new display region arranged along a first edge of the touch-sensitive display and configured to display history operation content, and the second new display region arranged along the first edge or a second edge of the touch-sensitive display and configured to display at least one application icon;
   receiving a target operation instruction;
   determining target content and a target application icon corresponding to the target operation instruction, wherein the target content is content selected from the history operation content displayed in the first new display region or content selected in an open application window of an executing application displaying content in the reduced size display region, and the target application icon is an application icon in the second new display region; and
   transmitting the target content to an application program corresponding to the target application icon in response to the target operation instruction.

2. The operation method according to claim 1, wherein,
   the first new display region comprises one or more of a document region, a picture region, a text region or a favorites region;
   the document region contains a document recently operated by a user;
   the picture region contains a picture recently operated by the user;
   the text region contains a text recently operated by the user; and
   the favorites region contains a link collected by a system.

3. The operation method according to claim 2,
   wherein, the target operation instruction is a drag operation instruction; and
   wherein, transmitting the target content to the application program corresponding to the target application icon in response to the target operation instruction comprises:

copying the target content to the application program corresponding to the target application icon in response to the drag operation instruction.

4. The operation method according to claim 1, wherein, the application icon comprises an icon representing the application itself, an application execution window icon, or a port of an application sharing program.

5. The operation method according to claim 4,
wherein, the target operation instruction is a drag operation instruction; and
wherein, transmitting the target content to the application program corresponding to the target application icon in response to the target operation instruction comprises:
copying the target content to the application program corresponding to the target application icon in response to the drag operation instruction.

6. The operation method according to claim 1, wherein, the target operation instruction is a drag operation instruction; and
wherein, transmitting the target content to the application program corresponding to the target application icon in response to the target operation instruction comprises:
copying the target content to the application program corresponding to the target application icon in response to the drag operation instruction.

7. The operation method according to claim 6, wherein in a case that the target application icon is an application icon or a port icon of an application sharing program and after the target content is copied to the application program corresponding to the target application icon in response to the drag operation instruction, the method further comprises displaying the application program corresponding to the target application icon in the original application display region, wherein the target content is in an editable state in the application program corresponding to the target application icon.

8. The operation method according to claim 6, wherein in a case that the target application icon is an application execution window icon and after the target content is copied to the application program corresponding to the target application icon in response to the drag operation instruction, the method further comprises: displaying a drag number indicator on the application execution window icon, wherein the drag number indicator is configured to indicate the number of drags performed for an application execution window corresponding to the application execution window icon.

9. A terminal device, comprising:
a processor; and
a memory storing instructions, which, when executed by the processor, configure the terminal device to perform processing comprising:
receive a screen splitting instruction, while an original application display region is displayed and prior to displaying a first new display region and a second new display region;
in response to the screen splitting instruction, split a screen of the touch-sensitive display into a reduced size display region displaying the original application display region, the first new display region arranged along a first edge of the touch-sensitive display and configured to display history operation content, and the second new display region arranged along the first edge or a second edge of the touch-sensitive display and configured to display at least one application icon;
receive a target operation instruction;

determine target content and a target application icon corresponding to the target operation instruction, wherein the target content is content selected from the history operation content displayed in the first new display region or content selected in an open application window of an executing application displaying content in the reduced size display region, and the target application icon is an application icon in the second new display region; and
transmit the target content to an application program corresponding to the target application icon in response to the target operation instruction.

10. The terminal device according to claim 9, wherein,
the first new display region comprises one or more of a document region, a picture region, a text region or a favorites region;
the document region contains a document recently operated by a user;
the picture region contains a picture recently operated by the user;
the text region contains a text recently operated by the user; and
the favorites region contains a link collected by a system.

11. The terminal device according to claim 10,
wherein, the target operation instruction is a drag operation instruction; and
wherein, the instructions, when executed by the processor, further configure the terminal device to perform processing comprising:
copy the target content to the application program corresponding to the target application icon in response to the drag operation instruction.

12. The terminal device according to claim 9, wherein the at least one application icon displayed in the second new display region comprises an icon representing the application itself, an application execution window icon, or a port of an application sharing program.

13. The terminal device according to claim 9,
wherein, the target operation instruction is a drag operation instruction; and
wherein, the instructions, when executed by the processor, further configure the terminal device to perform processing comprising:
copy the target content to the application program corresponding to the target application icon in response to the drag operation instruction.

14. The terminal device according to claim 13, wherein, the instructions, when executed by the processor, further configure the terminal device to perform processing comprising:
display the application program corresponding to the target application icon in the original application display region, in a case that the target application icon is an application icon or a port icon of an application sharing program and after the operation unit copies the target content to the application program corresponding to the target application icon in response to the drag operation instruction, wherein the target content is in an editable state in the application program corresponding to the target application icon.

15. The terminal device according to claim 13, wherein, the instructions, when executed by the processor, further configure the terminal device to perform processing comprising:
display a drag number indicator on an application execution window icon, in a case that the target application icon is the application execution window icon and after the target content is copied to the application program corresponding to the target application icon in response to the drag operation instruction, wherein the drag number indicator is configured to indicate the number of drags performed for an application execution window corresponding to the application execution window icon.

16. A non-transitory computer readable storage medium storing instructions, which, when executed by a processor of a computing device, configure the computing device to perform processing comprising:
 receive a screen splitting instruction, while an original application display region is displayed and prior to displaying a first new display region and a second new display region;
 in response to the screen splitting instruction, split a screen of the touch-sensitive display into a reduced size display region displaying the original application display region, the first new display region arranged along a first edge of the touch-sensitive display and configured to display history operation content, and the second new display region arranged along the first edge or a second edge of the touch-sensitive display and configured to display at least one application icon;
 receive a target operation instruction;
 determine target content and a target application icon corresponding to the target operation instruction, wherein the target content is content selected from the history operation content displayed in the first new display region or content selected in an open application window of an executing application displaying content in the reduced size display region, and the target application icon is an application icon in the second new display region; and
 transmit the target content to an application program corresponding to the target application icon in response to the target operation instruction.

17. The non-transitory computer readable storage medium according to claim 16, wherein,
 the first new display region comprises one or more of a document region, a picture region, a text region or a favorites region;
 the document region contains a document recently operated by a user;
 the picture region contains a picture recently operated by the user;
 the text region contains a text recently operated by the user; and
 the favorites region contains a link collected by a system.

18. The non-transitory computer readable storage medium according to claim 17,
 wherein, the target operation instruction is a drag operation instruction; and
 wherein, the instructions, when executed by the processor, further configure the computing device to perform processing comprising:
 copy the target content to the application program corresponding to the target application icon in response to the drag operation instruction.

19. The non-transitory computer readable storage medium according to claim 16, wherein,
 the at least one application icon displayed in the second new display region comprises an icon representing the application itself, an application execution window icon, or a port of an application sharing program.

20. The non-transitory computer readable storage medium according to claim 16,
 wherein, the target operation instruction is a drag operation instruction; and
 wherein, the instructions, when executed by the processor, further configure the computing device to perform processing comprising:
 copy the target content to the application program corresponding to the target application icon in response to the drag operation instruction.

\* \* \* \* \*